United States Patent

[11] 3,626,042

| [72] | Inventors | Harry Appleby;<br>Frederick Claud Cowlard, both of Ilford, England |
|---|---|---|
| [21] | Appl. No. | 838,326 |
| [22] | Filed | July 1, 1969 |
| [45] | Patented | Dec. 7, 1971 |
| [73] | Assignee | The Plessey Company Limited<br>Ilford, Essex County, England |
| [32] | Priority | July 12, 1968 |
| [33] | | Great Britain |
| [31] | | 33,490/68 |

[54] MANUFACTURE OF VITREOUS CARBON BODIES
4 Claims, No Drawings

[52] U.S. Cl. .................................................... 264/29,
23/209.1, 23/209.2, 156/155
[51] Int. Cl. ........................................................ C01b 31/02
[50] Field of Search ............................................ 23/209.1,
209.2, 209.4; 264/29; 156/155, 327, 335

[56] References Cited
UNITED STATES PATENTS

| 3,055,789 | 9/1962 | Gemmi ......................... | 156/327 |
|---|---|---|---|
| 3,084,394 | 4/1963 | Bickerdike et al. ............ | 23/209.1 N |
| 3,109,712 | 11/1963 | Redfern ........................ | 23/209.2 |
| 3,367,812 | 2/1968 | Watts ............................ | 23/209.4 X |

FOREIGN PATENTS

| 25,287 | 10/1964 | Japan ........................... | 264/29 |
|---|---|---|---|

*Primary Examiner*—Edward J. Meros
*Attorney*—Blum, Moscovitz, Friedman & Kaplan

ABSTRACT: Vitreous carbon bodies are produced by assembling a plurality of phenol-formaldehyde resinous bodies into a unitary composite body having a layer of a curable phenolic resin adhesive interposed between the contiguous surfaces, curing the adhesive while the surfaces are maintained in contact by external pressure, and firing the composite body to convert it to a unitary vitreous carbon body.

MANUFACTURE OF VITREOUS CARBON BODIES

This invention relates to a material which has become known as vitreous carbon. An example of a method of producing such a material is given in the specification of U.S. Pat. NO. 3,109,712, which essentially consists in first shaping a resinous body comprising purephenol formaldehyde and then converting this body into vitreous carbon by suitable heat treatment. Articles made of this material have proved useful for various purposes but a limitation to such usefulness is that the maximum thickness that can be obtained by the methods described in said U.S. Pat. No. specification while maintaining satisfactory properties of the material is limited.

We have now found that vitreous carbon bodies of greater thickness can be successfully produced by heat treatment of a phenolic-resin body which is fabricated by assembling part-bodies, each of smaller thickness, with an intervening layer of curable phenolic-resin adhesive, and then curing this adhesive before the composite body is heat treated for conversion into vitreous carbon.

According to the invention, a method of constructing a body of vitreous carbon comprises the steps of forming two transparent solid pieces of a pure phenol formaldehyde resin, said pieces having complementary surfaces, placing said complementary surfaces together with an intervening layer of phenolic resin adhesive, applying pressure to hold the surfaces together curing the adhesive and firing the resulting fabricated structure to form a vitreous carbon body. The phenolic resin adhesive may be a liquid phenolic resin with catalyst.

The complementary surfaces of the resin pieces may be prepared by a grinding process before these surfaces are placed together.

The invention also comprises a body of vitreous carbon when formed by the above-mentioned method.

By proceeding in the manner described above we have found that plates of vitreous carbon can be manufactured of about three times the thickness that was practicable by making a single plate in as great a thickness as was possible for a given quality and there seems no reason to suppose that there is any limitation to the ultimate thickness that can now be produced by this method.

In order that the invention may be clearly understood an example of a particular way of carrying out the invention will now be described.

A liquid phenolic resin was made by reacting in a glass vessel 40 moles of analytical reagent purity phenol with 60 moles of analytical reagent purity formaldehyde at a temperature of 102° C. for approximately 50 hours in the absence of any added catalyst. After removal of an aqueous layer which formed, the resin layer was dewatered by heating to a temperature of 90° C. over a period of 8 hours in a vacuum of approximately 2 mm. Hg. The resin was cast into pieces in the form of plates not exceeding one-fourth inch in thickness and after curing by heating up to a temperature of 160° C. over a period of 200 hours, the plates were removed from a casting mold, ground and lapped. A layer of liquid resin containing a catalyst such as caustic soda, thick enough to just completely cover the relevant surface of one plate, was smeared over one side of a plate and a further plate was brought into contact. Excess liquid resin was squeezed form the resulting joint by the application of a holding pressure and the laminate was then cured at a temperature of 90° C. for 24 hours while the holding pressure was maintained. After curing, the resin was converted to a vitreous carbon by firing the laminate structure in a furnace in an argon atmosphere to a temperature of 900° C. over a period of 28 days and then heating to 1800° C. under a vacuum of 2 mm. Hg over a period of 3 days.

At the end of this heating cycle, the laminate structure was allowed to cool and it was then removed from the firing furnace for examination. It was found that the fabricated structure had become completely converted to a vitreous carbon monolith, the resulting carbon body having considerable physical strength and the usual resistance to chemical reagents and exposure to high temperatures. No tendency for the joint between the original resin pieces to initiate weakening of the carbon structure was observed in the physical tests carried out.

Although the invention has been described in relation to the manufacture of flat plates it will be appreciated that other shaped bodies can be produced provided there are complementary surfaces on the pieces that are to be joined together to form the unitary final body.

What we claim is:

1. A method of making a shaped body consisting of a vitreous carbon of a given thickness, the method comprising the steps of forming transparent solid part bodies of a pure phenol-formaldehyde resin, each part-body of less than said given thickness, said part-bodies having mutually complementary surfaces permitting the part-bodies to be assembled, with said complementary surfaces in contact with each other, to jointly form a body of said given thickness, assembling the part-bodies in this manner with a layer of a curable phenolic-resin adhesive interposed between the contiguous complementary surface, curing the adhesive while applying pressure to hold the said surfaces together, and firing the resulting composite resin body to convert it to a unitary vitreous carbon body.

2. A method as claimed in claim 1, in which the phenolic resin adhesive is a liquid phenolic resin with catalyst.

3. A method as claimed in claim 1, in which curing of the adhesive is effected by heating at about 90° C. for 24 hours.

4. A method as claimed in claim 1, in which the complementary surfaces of the resin pieces are prepared by a grinding process.

* * * * *